(12) United States Patent
Helle et al.

(10) Patent No.: US 11,486,488 B2
(45) Date of Patent: Nov. 1, 2022

(54) PUMPING DEVICE FOR A TRANSMISSION AND TRANSMISSION COMPRISING SUCH A PUMPING DEVICE

(71) Applicant: Joma-Polytec GmbH, Bodelshausen (DE)

(72) Inventors: Torsten Helle, Dusslingen (DE); Hans-Peter Ott, Hirrlingen (DE)

(73) Assignee: JOMA-POLYTEC GMBH, Bodelshausen (DE)

( * ) Notice: Subject to any disclaimer, the term of this patent is extended or adjusted under 35 U.S.C. 154(b) by 449 days.

(21) Appl. No.: 16/791,132

(22) Filed: Feb. 14, 2020

(65) Prior Publication Data

US 2020/0271212 A1      Aug. 27, 2020

(30) Foreign Application Priority Data

Feb. 15, 2019    (DE) ...................... 10 2019 103 877.4

(51) Int. Cl.
*F16H 57/04*        (2010.01)
*F04B 43/04*        (2006.01)

(52) U.S. Cl.
CPC ..... *F16H 57/0461* (2013.01); *F16H 57/0436* (2013.01); *F04B 43/04* (2013.01)

(58) Field of Classification Search
CPC ............. F16H 57/0461; F16H 57/0436; F16H 57/0458; F16H 57/027; F04B 43/04
See application file for complete search history.

(56) References Cited

U.S. PATENT DOCUMENTS

| | | | | |
|---|---|---|---|---|
| 5,217,085 A | * | 6/1993 | Barrie | ...................... F01M 1/16 184/6.12 |
| 10,060,520 B2 | * | 8/2018 | Sterns | .................... F16H 57/027 |

(Continued)

FOREIGN PATENT DOCUMENTS

| | | |
|---|---|---|
| DE | 19860353 C1 | 6/2000 |
| DE | 10017271 A1 | 10/2001 |

(Continued)

OTHER PUBLICATIONS

English language Abstract of DE102015221299A1.
(Continued)

*Primary Examiner* — Thomas C Diaz
(74) *Attorney, Agent, or Firm* — Ware, Fressola, Maguire & Barber LLP (57) ABSTRACT

In order to enable efficient operation and reliable heat dissipation in a transmission, a pumping device (10) for lowering the internal pressure in a transmission (100) is equipped with a suction line (18), which leads from a suction point (20) on a connection side (14) to a discharge point (22) on a discharge side (16), a pump (24) for generating negative pressure at the suction point (20), a pump drive (26) for driving the pump (24), and an oil separator (28) connected upstream or downstream of the pump (24) in the suction line (18) that separates oil contained in the suction flow and returns it via a return line (30) to the connection side (14), and a check valve (34) connected downstream, preferably directly downstream, of the pump (24).
A transmission (100) with such a pumping device (10), a use of a pumping device (10) and a method for reducing power losses in a transmission (100) are disclosed.

20 Claims, 3 Drawing Sheets

(56) References Cited

U.S. PATENT DOCUMENTS

| | | | |
|---|---|---|---|
| 11,231,103 B2 * | 1/2022 | Staake | F16H 57/0441 |
| 2006/0137939 A1 * | 6/2006 | Smolong | F16N 7/385 184/6.12 |

FOREIGN PATENT DOCUMENTS

| | | |
|---|---|---|
| DE | 102014008116 A1 | 10/2001 |
| DE | 60316120 T2 | 6/2008 |
| DE | 102009020825 A1 | 4/2010 |
| DE | 10 2011 088 363 A1 | 6/2013 |
| DE | 10 2013 223 140 A1 | 5/2015 |
| DE | 102014114770 A1 | 4/2016 |
| DE | 10 2015 004 991 B3 | 8/2016 |
| DE | 102015007551 A1 | 12/2016 |
| DE | 102015219503 A1 | 4/2017 |
| DE | 10 2015 221 299 A1 | 5/2017 |
| DE | 102016211226 B3 | 6/2017 |
| JP | 2008144900 A * | 6/2008 ......... F16H 57/0421 |

OTHER PUBLICATIONS

English language Abstract of DE102015004991B3.
English language Abstract of DE102013223140A1.
English language Abstract of DE102011088363A1.
English language Abstract of DE10017271.
English language Abstract of DE1986053.
English language Abstract of DE60316120.
English language Abstract of DE102009020825.
English language Abstract of DE102014008116.
English language Abstract of DE102014114770.
English language Abstract of DE102015007551.
English language Abstract of DE102015219503.
English language Abstract of DE102016211226.

* cited by examiner

PUMPING DEVICE FOR A TRANSMISSION AND TRANSMISSION COMPRISING SUCH A PUMPING DEVICE

BACKGROUND OF THE INVENTION

1. Field of Invention

The invention relates to a pumping device for lowering the internal pressure in a transmission featuring a suction line which leads from a suction point on a connection side to a discharge point on a discharge side, a pump for generating negative pressure at the suction point, a pump drive for driving the pump, an oil separator connected upstream or downstream of the pump in the suction line which separates oil contained in the suction flow and returns it via a return line to the connection side, and a check valve connected downstream, preferably directly downstream, of the pump. In addition, the invention relates to a transmission with such a pumping device having the features of the secondary independent claim. The invention also relates to the use of a pumping device and a corresponding method for reducing power losses in a transmission according to the further secondary independent claims.

2. Description of Related Art

Transmissions of the type mentioned above, for example transmissions coupled to electric motors (electric drive units), are known from the prior art, for example from DE 10 2018 100 649 A1. Drive units of this type, which are sometimes also referred to as "E-axles," usually have a motor, in particular an electric motor, and a transmission, which is operatively connected to the motor, and drive, for example, a drive axle or a drive wheel of a vehicle. For reasons of weight and installation space, drive units are increasingly being integrated into compact engine transmission units. Today such drive units operate at high speeds, electrical drive units, for example, at speeds in the range from 15,000 to 20,000 rpm, so that also the gears of a transmission rotate at relatively high speed.

The problem is that the high rotational speeds and the resulting high speeds of the gear teeth cause the oil used for lubrication to foam. The air bubbles embedded in the oil affect the properties of the medium, in particular the heat dissipation. In addition, there are losses from air friction, i.e. from the friction between the teeth of a rotating gear and the air contained in a transmission or a drive unit.

SUMMARY OF THE INVENTION

The object of the invention is to enable efficient operation and reliable heat dissipation in transmissions or drive units.

The invention achieves this object by means of a pumping device for lowering the internal pressure in a transmission or gearbox having the features of claim 1. Accordingly, the pumping device is characterized by a suction line which leads from a suction point on a connection side of the pumping device (facing the transmission or the drive unit or its interior) to a discharge point on a discharge side of the pumping device. A pump (integrated in the suction line) is used to generate negative pressure at the suction point. A pump drive is also provided which drives the pump, preferably in a controllable manner. In addition, an oil separator connected downstream of the pump in the suction line or upstream of the pump in the suction line is provided that separates oil contained in the suction flow and returns it to the connection side via a return line. In addition, a check valve is provided downstream of the pump, preferably directly/immediately downstream of the pump. The check valve is preferably spring-loaded.

The air pressure in the transmission or the drive unit can be reduced by the pumping device, so that the resistance of the air friction and the oil foaming are relatively low. This is of considerable advantage for transmissions in general and in particular for electric drive units, especially since the trend is towards higher rotational speeds in order to make transmissions and drive units lighter and less expensive with the same output. The lower oil foaming contributes to better heat dissipation, for example to better heat dissipation towards the wall of the transmission or the drive unit or if the oil is conducted, for example, via a heat exchanger.

The lowering of the air pressure in the transmission or the drive unit creates a negative pressure relative to the area surrounding the transmission or the drive unit. A complete vacuum is unlikely to be achieved in the interior; however, following the applicant's attempts, an internal pressure in the transmission or the drive unit of approximately 450 mbar to 550 mbar (millibars) absolute is possible and contributes to a considerably more efficient operation by comparison.

The pumping device can be designed as a pump unit or pump module, in particular as a pump module that can be retrofitted. In this way, such a pumping device or such a pump module can be easily supplemented or retrofitted on an existing transmission or a drive unit. An optional equipment of the pumping device as a "customer option" on a transmission or a, for example, electrical, drive unit is also conceivable.

The pump drive is operatively connected to drive the pump. For this purpose, the pump drive can be coupled to the pump, for example by means of a shaft or a shaft section.

The connection side of the pumping device is the side with which the pumping device is connected to a fastening side of the transmission or the drive unit, that is to say which faces the interior of the transmission or the drive unit and is operatively connected to it. In the assembled state, the connection side of the pumping device can delimit the interior of the transmission or the preferably electric drive unit with respect to the outside. The connection side can be arranged, for example, on the end face or on an end face of the pumping device.

The pumping device can be connected to the transmission or the drive unit on the connection side. For this purpose, the pumping device can have a flange section on the connection side with which the pumping device is flanged to the transmission or the drive unit. For this purpose, the flange section can have retaining tabs and/or axial or radial sealing elements, for example corresponding sealing rings. A fastening section corresponding to the flange section, in particular partially or fully complementary, can be formed on the transmission or the drive unit.

As previously explained, the discharge point is on the discharge side of the pumping device. The suction flow (freed of oil by the oil separator) can be discharged into the area surrounding the pumping device or the transmission or the drive unit via the discharge point. The discharge side is thus oriented away from the transmission or the drive unit. The discharge side can be arranged, for example, on the cladding side or on a cladding side of the pumping device.

As also previously explained, a check valve is connected in the suction line of the pump. The check valve is used to decouple the part of the suction line that is upstream from the check valve from the surrounding area (starting at the discharge point). This ensures that no ambient air is drawn in at the discharge point. In addition, the pump or the pump drive can be deactivated at least temporarily after a certain pump operating time if a sufficient negative pressure is achieved on the connection side or in the interior of the transmission or the drive unit. It is advantageous if the check valve has only a low opening pressure, for example an opening pressure of approximately $\Delta p \approx 0.01$ bar.

According to a preferred embodiment, the pump can be embodied as a diaphragm pump or membrane pump. This creates a structurally simple and technically robust pump, in which the drive components of the pump are separated by the membrane from the pumped medium, in this case an oil-air mixture. Since the volume of air to be extracted (delivery volume) does not have to be large, a diaphragm pump is sufficient for the pumping device.

The pump drive can expediently be designed as an electrical drive, in particular as an electric motor. This enables a structurally simple, inexpensive and space-saving pump drive to be implemented. In addition, by operating or regulating the electric motor, the operation of the pump, for example also its delivery volume per unit of time, can be regulated in a simple manner.

The oil separator can advantageously be designed as a semipermeable membrane or have a semipermeable membrane. The semipermeable membrane is designed in particular in such a way that air can pass the membrane in both directions, but oil and/or oil vapors is retained. This enables efficient oil separation. As an alternative to this, the oil separator can be a porous, air-permeable body, for example made of a sintered material on the surface of which oil mist is deposited.

According to a preferred embodiment, the return line can have a venting valve, in particular a (further) check valve, downstream of the oil separator in order to limit the negative pressure. In this way, the pressure prevailing on the connection side of the pumping device or the internal pressure in the transmission or in the (electrical) drive unit can be limited. For this purpose, the further check valve can have an opening pressure of, for example, approximately $\Delta p \approx 450\text{-}550$ mbar (millibar).

In an advantageous manner, a pressure sensor can be provided which detects the pressure prevailing on the connection side (suction point) and is configured to output a pressure signal to a control and/or regulating unit. In this way, the pump or the pump drive can be regulated as required. The pressure prevailing on the connection side, for example the internal pressure of a connected transmission or a connected drive unit, can thus be regulated in a specific manner. It is therefore possible to define pressures at which the pump or pump drive is to run. For example, a "switch-on pressure" (pump starts up and generates negative pressure at the suction point) and a "switch-off pressure" (sufficient negative pressure at the suction point has been reached) can be determined.

The pumping device, in particular the pump drive and the pressure sensor, can expediently be configured to be connected to an external control and/or regulating unit, in particular by means of an electrical/electronic interface. In this way, the pumping device or certain components of the pumping device can be connected in a simple manner to an external control and/or regulating unit, for example to a control and/or regulating unit of the transmission or the drive unit. The interface can optionally be designed as a plug connection, for example with a plug and/or a socket.

According to a preferred embodiment, the pumping device can have an internal control and/or regulating unit, i.e. one that is integrated into the pumping device or into its housing. The pumping device thus has its own control and/or regulating unit and can thus be controlled independently. The pump drive, for example an electric motor, and/or the pressure sensor, which detects the pressure prevailing on the connection side (suction point), can be connected to the control and/or regulating unit. Corresponding connection lines can be provided on the integrated control and/or regulating unit for energy supply and/or signal transmission.

The pumping device can advantageously have a tubular housing which extends along a central longitudinal direction and houses the components of the pumping device. The components of the pumping device are thus protected from environmental influences. The housing can be made of plastic, for example. On the connection side, the pumping device can have a flange section with which the pumping device can be flanged to the transmission or the drive unit (already described above). As already indicated above, retaining tabs which have one or more passages can be formed on the flange section. The pumping device can thus be screwed onto the transmission or the drive unit. The housing can have a round, for example a circular, cross section and can be designed to be relatively flat. For example, the housing can have a diameter of approx. 80 mm (millimeters) and a height of approx. 40 mm. Deviations of ±20 millimeters from the above are considered to be covered by this.

A labyrinth can advantageously be formed at the suction point. As a result, the suction line can be protected from splash oil, for example from oil splashing around in the transmission or in the drive unit. In this way, relatively little oil gets into the suction line and the oil separator can be relieved.

As an alternative or in addition to a labyrinth, the suction point can be arranged on the connection side in such a way that only a little oil reaches the suction point.

The aforementioned object is also achieved by a transmission or gearbox with such a pumping device having the features of the secondary independent claim. With regard to the advantages that can be achieved with this, reference is made to the relevant statements in connection with the pumping device described above.

The transmission can have one or more gear stages, so that a gear ratio suitable for the respective application can be achieved. This enables a speed and/or torque conversion. In general, the transmission can be a transmission of any kind, for example a motor vehicle transmission (multi-speed manual or dual clutch transmission), a transmission of a machine tool or a transmission of a drive unit.

The transmission can have one or more motor drives or be coupled to them. The motor drive can be designed as one or more electric motors. If the motor drive in the form of one or more motors, for example electric motors, is integrated in the transmission or—in other words—the transmission and motor drive are combined to form one unit, this can be a drive unit. When equipped with one or more electric motors, the drive unit can be designed as an electric drive unit.

The electric drive unit itself can be designed as an electric axle ("E-axle"), wheel drive or wheel hub drive. As already explained, the drive unit can have one or more electric motors which serve as drive sources for the electric drive unit.

Furthermore, the drive unit can have one or more transmissions or gearboxes, each of which is coupled to one of the electric motors, for example by connection by means of a shaft or a shaft section. The transmission or transmissions (gearbox or gearboxes) can each be designed as a gear mechanism. In addition, the transmissions can have one, two or more gear stages (single-stage, two-stage or multi-stage transmissions).

According to a preferred embodiment, the transmission or the drive unit can have an active lubrication device for supplying oil to one or more gear stages of the transmission or the drive unit. A very specific lubrication ("forced lubrication") of one or more gear stages can thus take place, for example by supplying lubricating oil to a very specific point in a gear stage (gear pair) by means of a lubricant nozzle.

The active lubrication device can have an oil delivery line that extends from an oil suction point to one or more oil discharge points. The oil suction point can be located, for example, at an oil sump of the transmission or, for example, the electrical drive unit (below a fill level of the lubricating oil). The one or more oil discharge points can be located in the transmission or in the drive unit at a gear stage, for example in the area of a gear pair of the gear stage (above a fill level of the lubricating oil).

An oil filter, an oil pump/transmission oil pump and/or a heat exchanger can also be arranged between the oil suction point and the oil discharge point. The oil filter can restrain dirt particles in the oil. The oil pump or transmission oil pump serves as a conveying system for lubricating oil and can generate a vacuum at the oil suction point when switched on. The heat exchanger is used for heat exchange, in particular for heat dissipation, between the lubricating oil that is heated as a result of lubrication and the area surrounding the transmission or the, for example electrical, drive unit.

In the installed position of the transmission or the, for example, electrical drive unit, the pumping device can advantageously be mounted on the top of the transmission or the drive unit, preferably in the direction of the gravity, and, at least on the connection side of the pumping device, be sealed off from the transmission or the drive unit. This largely protects the pumping device from environmental influences of the road, for example stone chips, splash water and the like. In addition, a favorable arrangement of the pumping device with regard to spray oil is achieved, since very little spray oil arrives in the upper region of the transmission or the drive device due to gravity.

The aforementioned object is also achieved by using a pumping device, in particular a pumping device as described above, for lowering the internal pressure in a transmission or gearbox, in particular a transmission or gearbox as described above. The transmission or gearbox can have one or more gear stages and/or one or more drives, for example electric motors, as described above. The transmission or gearbox can thus be designed as an electrical drive unit. With regard to the achievable advantages, the relevant statements in connection with the pumping device apply. The measures described in connection with the pumping device or the transmission/gearbox can be used to further formulate the use.

The aforementioned object is also achieved by a method for reducing power losses in a transmission or gearbox, in particular a transmission or gearbox as described above, having the features of the secondary independent claim. The transmission can be designed as described above, for example as a drive unit. With regard to the advantages that can be achieved with the method, the relevant statements in connection with the pumping device apply.

The method has the following steps:
Connecting a pumping device to the transmission, in particular a transmission as described above, and
Activating a pump of the pumping device, wherein a medium contained in the interior of the transmission, for example an air-oil mixture, is discharged via a suction line, so that a negative pressure results in the interior of the transmission relative to the surrounding area.

According to a preferred embodiment, the negative pressure prevailing in the interior can be limited, in particular by means of a venting valve. In this way, an excessive differential pressure relative to the surrounding area can be avoided. In addition, when the transmission or the electric drive unit and the lubricating oil cool down, for example after operation of the transmission or the drive unit, the latter can be "vented" accordingly.

The negative pressure prevailing in the interior of the transmission or the drive unit can advantageously be monitored and regulated in such a way that a negative pressure between approximately 100 mbar to 550 mbar (millibars), preferably between approximately 300 mbar to 550 mbar, further preferably 400 mbar to 550 mbar, develops during operation of the transmission or the drive unit relative to the surrounding area. In this way, the resistance to air friction and oil foaming can be reduced considerably, as explained above.

The measures described above in connection with the pumping device or the transmission can serve to further configure the method.

The invention is explained in more detail below with reference to the figures, the same or functionally identical elements being provided where present with identical reference numerals, but in some cases only once. Shown in each of the schematic views are.

BRIEF DESCRIPTION OF THE DRAWING

DETAILED DESCRIPTION OF THE BEST MODE OF THE INVENTION

Figure 1:
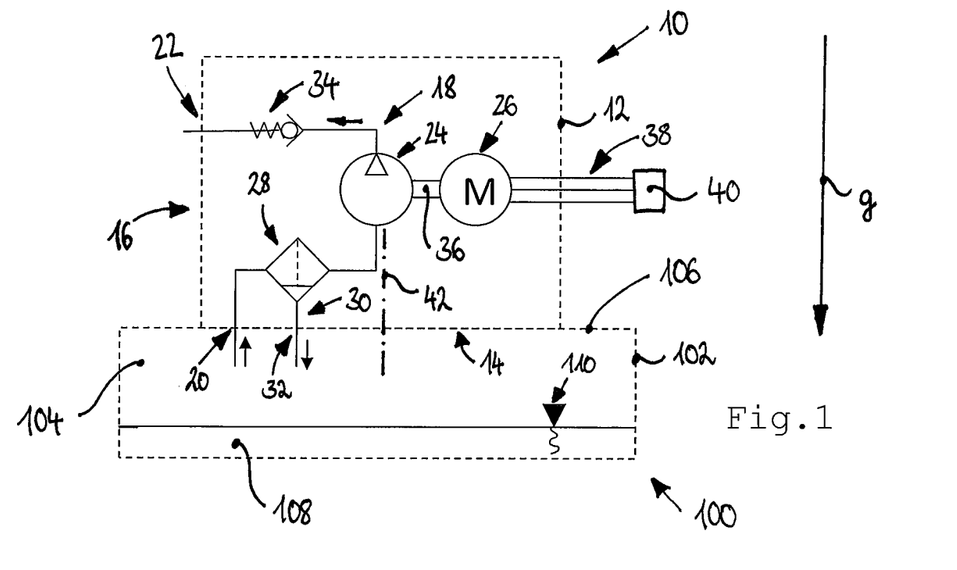
FIG. 1 an embodiment of the pumping device and the transmission.

FIG. 1 shows a pumping device for lowering the internal pressure in a transmission or gearbox, the pumping device being designated overall by reference number 10. In addition, FIG. 1 shows a transmission or gearbox designed as an electric drive unit, which is designated overall by reference number 100 and has such a pumping device 10.

As will be explained further below, the transmission 100 can have one or more gear stages 130, 132, which can be coupled to an electric motor 126 and combined with it to form a unit (cf. FIG. 6). The transmission 100 is therefore referred to below as the electric drive unit 100.

The pumping device 10 has a housing 12 in which the components of the pumping device 10 are accommodated (see FIG. 1). The electric drive unit 100 has a housing 102 in which the components of the electric drive unit 100 are accommodated.

The pumping device 10 or its housing 12 has a connection side 14, which is in particular the front side 14 of the housing 12, and a cladding side 16, which may also be referred to as the discharge side 16. The connection side 14 of the pumping device 10 is the side with which the pumping device 10 is connected to the drive unit 100. The connection side 14 faces a fastening side 106 and the interior 104 of the drive unit 100 and is operatively connected to it.

The pumping device 10 can have on the connection side 14 a flange section (not shown in more detail) with which the pumping device 10 is flanged to the drive unit 100. The flange section can have retaining tabs or sealing elements, as described above. A fastening section corresponding to the flange section can also be formed on the drive unit 100 (likewise not shown in detail).

Figure 6:
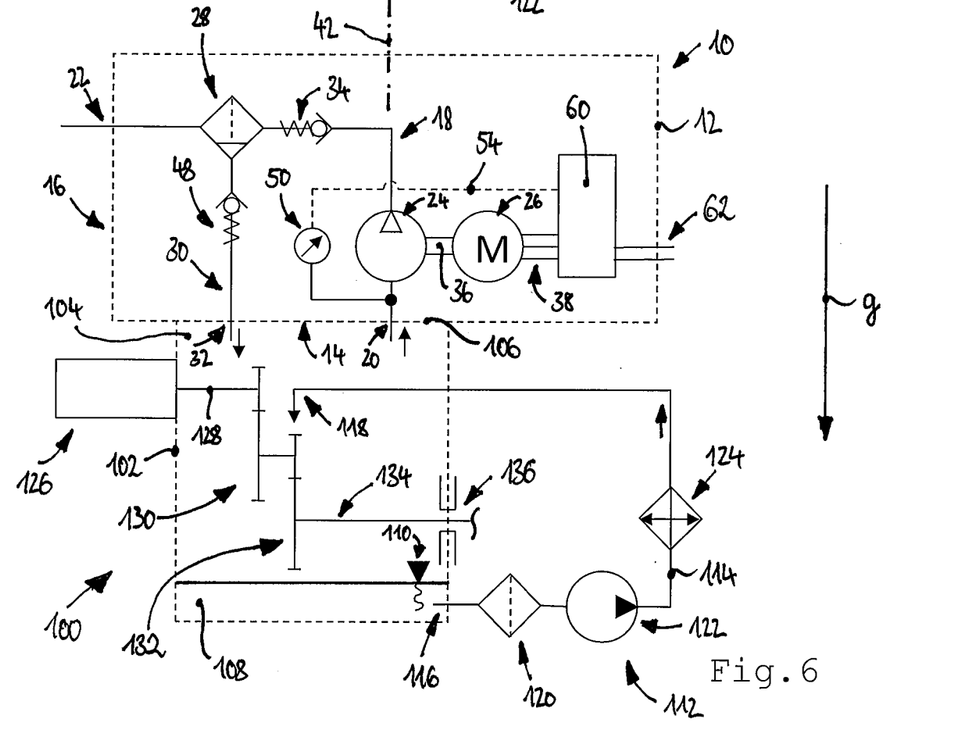
FIG. 6 an embodiment of the pumping device and the transmission according to FIG. 5, a plurality of gear stages being additionally illustrated.

As already indicated, the electric drive unit 100 can have one or more electric motors and one or more gear stages (gear mechanisms), which are functionally connected to the electric motor (cf. FIG. 6). For lubrication and/or cooling, in particular of the components of the one or more gear stages, the electric drive unit 100 has a lubricating oil 108 with which the electric drive unit 100 is filled up to a defined fill level 110 (oil sump; see FIG. 1).

The pumping device 10 serves to lower the internal pressure in the electric drive unit 100. The pumping device 10 has a suction line 18 which leads from a suction point 20 on the connection side 14 of the pumping device 10 to a discharge point 22 on the discharge side 16 of the pumping device 10.

The pumping device 10 also has a pump 24 for generating negative pressure at the suction point 20. In addition, a pump drive 26 is provided for controllably driving the pump 24.

Connected upstream of the pump 24 in the suction line 18, the pumping device 10 also has an oil separator 28, which separates oil contained in the suction flow (flow within the suction line 18) and returns it via a return line 30 to a return point 32 on the connection side 14. Furthermore, the pumping device 10 has a check valve 34, preferably spring-loaded, connected in the suction line 18 downstream of the pump 24.

During operation of the pumping device 10, a medium contained in the interior 104 of the electric drive unit 100, for example an air-oil mixture, is sucked in at the suction point 20 and, via the suction line 18, via the oil separator 28, the check valve 34 and the discharge point 22, is transported to the area surrounding the pumping device 10 or the drive unit 100. As a result, the air pressure in the electric drive unit 100 can be reduced, so that the resistance to air friction and the oil foaming are reduced.

The pump drive 26 and the pump 24 are connected to one another by means of a shaft 36. The pump drive 26 can be designed as an electrical drive, in particular as an electric motor 26. The electric motor 26 has a plurality of connecting lines 38, to which a plug connector 40 is optionally connected. The connecting lines or the electric motor 26 can be connected to an external controller (not shown) via the plug connector 40.

The pump 24 can be designed as a diaphragm pump or membrane pump. The oil separator 28 can be designed as a semipermeable membrane or can have a semipermeable membrane, as described above.

As already described, the pumping device 10 has a housing 12. The housing 12 can be designed as a tubular housing 12 which extends along a central longitudinal direction 42 and accommodates the components of the pumping device 12. As already described above, the tubular housing 12 can have a circular cross section. The discharge side 16 represents the cladding side 16 and the connection side 14 an end face 14 of the housing 12.

Optionally, a labyrinth can be formed at the suction point 20 (not shown) in order to protect the suction line 18 from splash oil. Irrespective of this, the suction point 20 can be arranged in such a way that only a little spray oil arrives.

The pumping device 10 is mounted in the installed position of the drive unit 100 in the gravity direction g on top of the drive unit 100 (fastening side 106), and, at least on the connection side 14, the pumping device 10 is sealed off from the drive unit 100.

Figure 2:
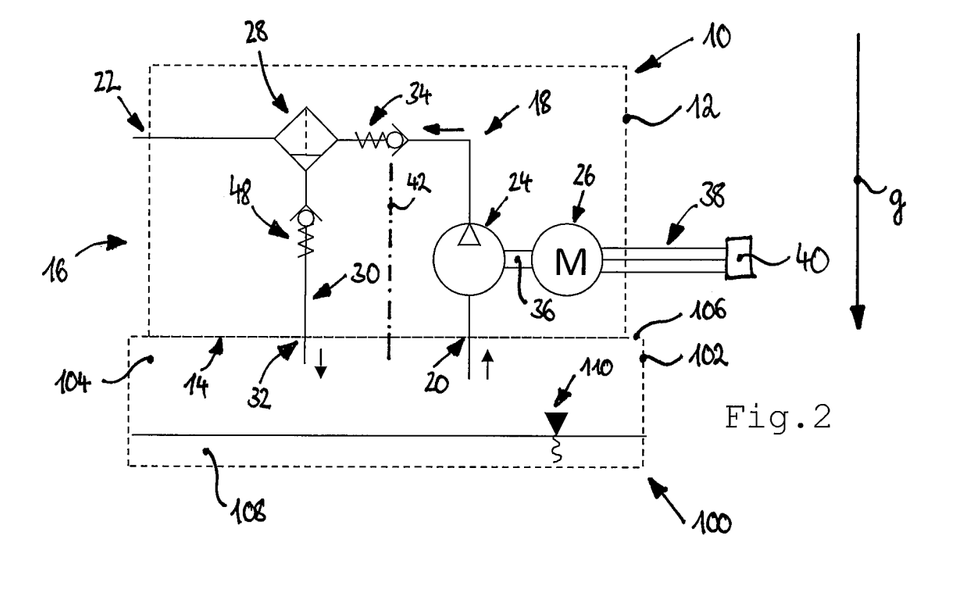
FIG. 2 an embodiment in which the pumping device according to FIG. 1 additionally has a venting line.

FIG. 2 shows an embodiment of the pumping device 10, which largely corresponds to the pumping device 10 described in connection with FIG. 1, so that, to avoid repetition, reference is made to the explanations given there. Deviating from this, the oil separator 28 is connected downstream of the pump 24. Specifically, the oil separator 28 can be connected in the suction line 18 between the check valve 34 and the discharge point 22.

In addition, the return line 30 has a venting valve 48 downstream of the oil separator 28 to limit the negative pressure on the connection side 14 or the internal pressure in the electric drive unit 100. The venting valve 48 is designed in particular as a further check valve 48, as described above.

Figure 3:
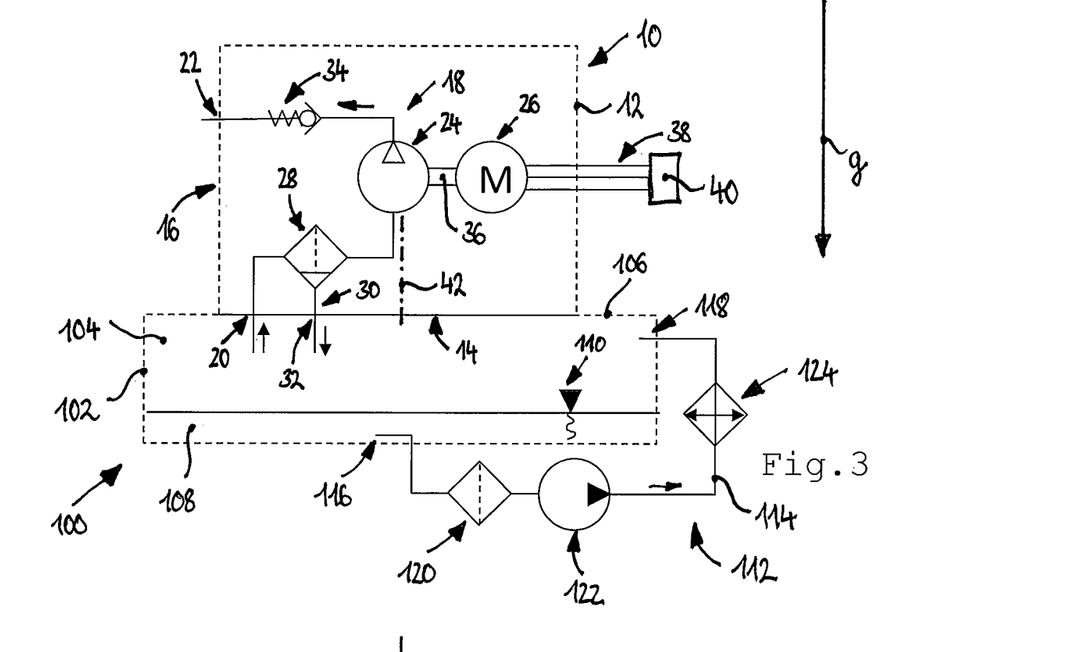
FIG. 3 an embodiment in which the transmission according to FIG. 1 additionally has an active lubrication device.

FIG. 3 shows an embodiment in which the electric drive unit 100 largely corresponds to the embodiment described in FIG. 1, so that, to avoid repetition, reference is made to the explanations given there.

In addition, the electric drive unit 100 has an active lubrication device 112 for supplying lubricating oil to one or more gear stages (not shown) of the drive unit 100.

The active lubrication device 112 has an oil delivery line 114, which extends from an oil suction point 116 (below the fill level 110) to one or more oil discharge points 118 (above the fill level 110). An oil filter 120, an oil pump or transmission oil pump 122 and/or a heat exchanger 124 are optionally arranged in the oil delivery line 114 between the oil suction point 116 and the oil discharge point 118, as described above.

Figure 4:
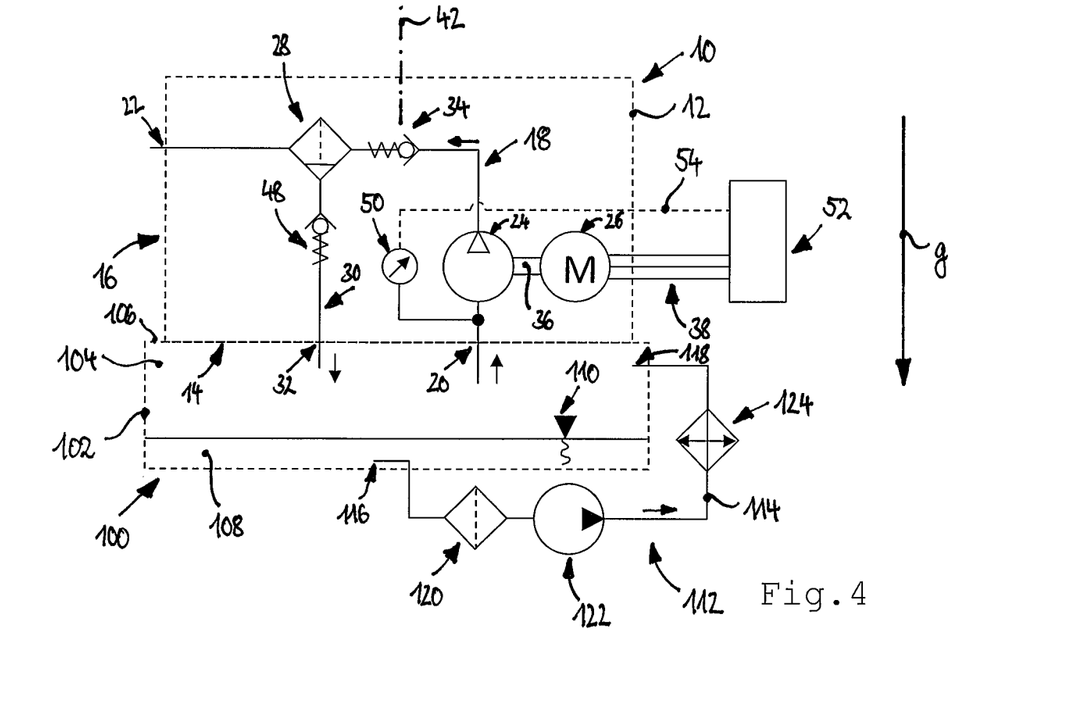
FIG. 4 an embodiment in which the pumping device according to FIG. 2 additionally has a pressure sensor and an external control and/or regulating unit is provided.

FIG. 4 shows an embodiment in which the pumping device 10 corresponds to the embodiment described in FIG. 2 and the drive unit 100 corresponds to the embodiment described in FIG. 3, so that, to avoid repetition, reference is made to the explanations given there.

In addition, the pumping device 10 has a pressure sensor 50, which detects the pressure prevailing on the connection side 14, in particular at the suction point 20, and is configured to output a pressure signal or a signal representing a pressure to an external control and/or regulating unit 52. This can be done via a signal line 54.

The pump drive 26 is also connected to the external control and/or regulating unit 52 via the connecting lines 38. This can be an external (outside the pumping device 10) control and/or regulating unit 52, for example a control and/or regulating unit of the drive unit 100. Such a configuration allows the pumping device 10 or the pump 24 to be regulated as required, for example with defined switch-on pressures and switch-off pressures, as described above.

Figure 5:
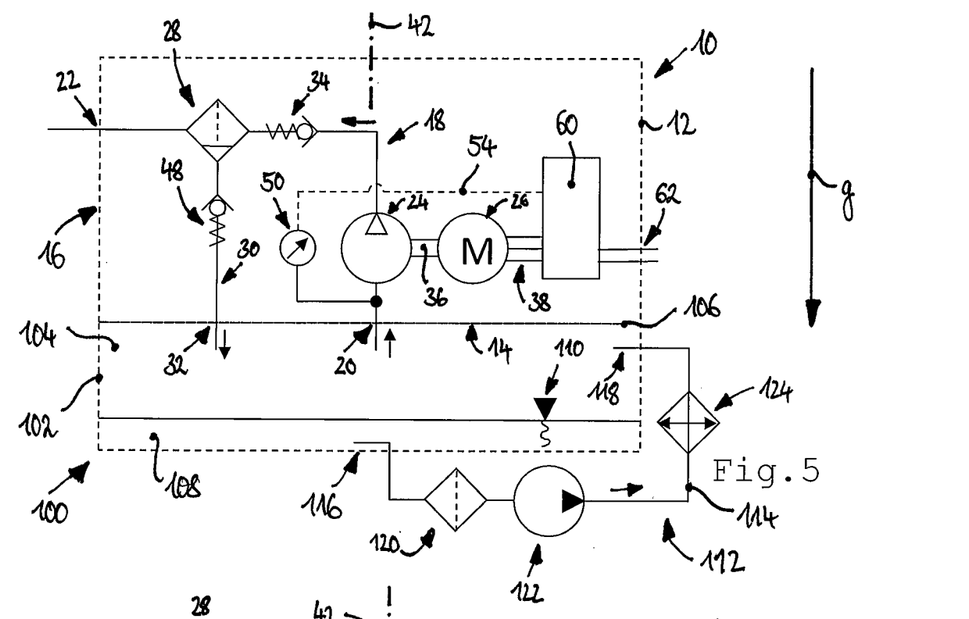
FIG. 5 an embodiment of the pumping device according to FIG. 4, the pumping device having an internal control and/or regulating unit.

FIG. 5 shows an embodiment in which the pumping device 10 and the drive unit 100 largely correspond to the embodiment described in FIG. 4, so that, to avoid repetition, reference is made to the explanations given there.

Deviating from this, the pumping device 10 in the present exemplary embodiment has an internal control and/or regulating unit 60 integrated in the pumping device 10 or its housing 12. The pressure sensor 50 is connected to the integrated control and/or regulating unit 60 via a signal line 54.

The electric motor 26 is connected to the integrated control and/or regulating unit 60 via the connection lines 38. Connection lines 62 are provided on the integrated control and/or regulating unit 60, via which a power supply and/or a signal transmission to further external control units or to a bus system can take place.

The internal control and/or regulating unit 60, the pressure sensor 50 and the electric motor 26 also enable the pumping device 10 or the pump 24 to be regulated as required.

FIG. 6 shows an embodiment in which the pumping device 10 and the drive unit 100 largely correspond to the embodiment described in FIG. 5, so that, to avoid repetition, reference is first made to the explanations given there.

The electric drive unit 100 has an electric motor 126, the motor shaft 128 of which is coupled to two gear stages 130, 132. The gear stages 130, 132 are designed as gear mechanisms. The second gear stage 132 is coupled to an output shaft 134, which exits the housing 102 of the electrical drive unit 100 at a passage 136.

The output shaft 134 can serve, for example, to drive a vehicle axle or a vehicle wheel. One or more bearing elements, for example ball bearings, and sealing elements, for example radial shaft sealing rings, can be provided at the passage 136.

In the present example, the oil discharge point 118 is led directly to the second gear stage 132 in order to apply lubricating oil, for the purpose of lubrication and cooling, to the gear connection of the second gear stage 132 that is there.

The invention claimed is:

1. A pumping device (10) for lowering the internal pressure in a transmission (100), comprising:
    a suction line (18) which leads from a suction point (20) on a connection side (14) to a discharge point (22) on a discharge side (16),
    a pump (24) for generating negative pressure at the suction point (20), a pump drive (26) for driving the pump (24),
    an oil separator (28) connected upstream or downstream of the pump (24) in the suction line (18) which separates oil contained in the suction flow and returns it via a return line (30) to the connection side (14), and
    a check valve (34) connected downstream of the pump (24).

2. The pumping device (10) according to claim 1, characterized in that the pump (24) is configured as a diaphragm pump and/or that the pump drive (26) is configured as an electrical drive (26).

3. The pumping device (10) according to claim 1, characterized in that the oil separator (28) is configured as a semipermeable membrane or has a semipermeable membrane or that the oil separator (28) is designed as a porous, air-permeable body.

4. The pumping device (10) according to claim 1, characterized in that the return line (30) has a venting valve (48) for limiting the negative pressure downstream of the oil separator (28).

5. The pumping device (10) according to claim 1, characterized in that a pressure sensor (50) is provided which detects the pressure on the connection side (14) and is configured to transmit a pressure signal to a control and/or regulating unit (52, 60).

6. The pumping device (10) according to claim 1, characterized in that the pumping device (10), including the pump drive (26) and the pressure sensor (50), comprises an electrical/electronic interface (40) configured to connect to an external control and/or regulating unit (52) by means of an electrical/electronic interface (40).

7. The pumping device (10) according to claim 1, characterized in that the pumping device (10) comprises an integrated control and/or regulating unit (60).

8. The pumping device (10) according to claim 1, characterized in that the pumping device (10) has a tubular housing (12) which extends along a central longitudinal direction (42) and accommodates components of the pumping device (10).

9. The pumping device (10) according to claim 1, characterized in that a labyrinth is formed at the suction point (20).

10. A transmission (100) comprising a pumping device (10) according to claim 1.

11. The transmission (100) according to claim 10, characterized in that the transmission (100) has one or more gear stages (130, 132) and/or one or more motor drives (126), and/or one or more electric motors (126).

12. The transmission (100) according to claim 10, characterized in that the transmission (100) has an active lubrication device (112) for supplying oil to one or more gear stages (130, 132) of the transmission (100).

13. The transmission (100) according to claim 10, characterized in that the pumping device (10) in the installed position of the transmission (100) is mounted on top of the transmission (100) and is sealed with respect to the transmission (100) at least on the connection side (14) of the pumping device (10).

14. A use of a pumping device (10) according to claim 1, for lowering the internal pressure in a transmission (100), including where the transmission (100) has a pumping device (10) with a suction line (18) which leads from a suction point (20) on a connection side (14) to a discharge point (22) on a discharge side (16), a pump (24) for generating negative pressure at the suction point (20), a pump drive (26) for driving the pump (24), an oil separator (28) connected upstream or downstream of the pump (24) in the suction line (18) which separates oil contained in the suction flow and returns it via a return line (30) to the connection side (14), and a check valve (34) connected downstream of the pump (24).

15. A method for reducing power losses in a transmission (100), including a transmission (100) according to claim 10, comprising the following steps:
    connecting a pumping device (10) to the transmission (100), having a suction line (18) which leads from a suction point (20) on a connection side (14) to a discharge point (22) on a discharge side (16), a pump (24) for generating negative pressure at the suction point (20), a pump drive (26) for driving the pump (24), an oil separator (28) connected upstream or downstream of the pump (24) in the suction line (18) which separates oil contained in the suction flow and returns it via a return line (30) to the connection side (14), and a check valve (34) connected downstream of the pump (24); and activating a pump (24) of the pumping device (10), wherein a medium contained in the interior (104) of the transmission (100) is discharged via a suction line (18), so that there is a negative pressure in the interior (104) of the transmission (100) relative to the surrounding area.

16. The method according to claim 15, characterized in that the negative pressure in the interior (104) is limited.

17. The method according to claim 15, characterized in that the negative pressure in the interior (104) is monitored and regulated in such a way that a negative pressure of between 100 mbar and 550 mbar in relation to the area surrounding the drive unit (100) results during operation of the transmission (100).

18. The pumping device (10) according to claim 2, characterized in that the oil separator (28) is configured as a semipermeable membrane or has a semipermeable membrane or that the oil separator (28) is designed as a porous, air-permeable body.

19. The pumping device (10) according to claim 2, characterized in that the return line (30) has a venting valve (48) for limiting the negative pressure downstream of the oil separator (28).

20. The pumping device (10) according to claim 2, characterized in that a pressure sensor (50) is provided which detects the pressure on the connection side (14) and is configured to transmit a pressure signal to a control and/or regulating unit (52, 60).

* * * * *